(12) United States Patent
Kim et al.

(10) Patent No.: US 11,624,103 B2
(45) Date of Patent: Apr. 11, 2023

(54) COPPER ALLOY FOR LASER CLADDING VALVE SEAT

(71) Applicants: Hyundai Motor Company, Seoul (KR); Kia Motors Corporation, Seoul (KR)

(72) Inventors: Young-Nam Kim, Gyeonggi-do (KR); Go-Woon Jung, Gyeonggi-do (KR); Gi-Bum Kim, Seoul (KR); Han-Jae Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 40 days.

(21) Appl. No.: 16/889,191

(22) Filed: Jun. 1, 2020

(65) Prior Publication Data

US 2021/0180156 A1    Jun. 17, 2021

(30) Foreign Application Priority Data

Dec. 16, 2019    (KR) .................. 10-2019-0167659

(51) Int. Cl.
*F16K 25/00*    (2006.01)
*C22C 9/06*    (2006.01)

(52) U.S. Cl.
CPC .............. *C22C 9/06* (2013.01); *F16K 25/005* (2013.01)

(58) Field of Classification Search
None
See application file for complete search history.

(56) References Cited

U.S. PATENT DOCUMENTS

| | | | | |
|---|---|---|---|---|
| 2,102,238 A | * | 12/1937 | Merica | C22C 19/00 |
| | | | | 148/675 |
| 5,843,243 A | * | 12/1998 | Kawasaki | C22C 9/06 |
| | | | | 148/435 |
| 2017/0037495 A1 | | 2/2017 | Kawasaki et al. | |

FOREIGN PATENT DOCUMENTS

| | | |
|---|---|---|
| JP | 2984344 B2 | 11/1999 |
| JP | 2004-162100 A | 6/2004 |
| JP | 2005-297051 A | 10/2005 |
| JP | 2018-158379 A | 10/2018 |
| KR | 2002-0019296 A | 3/2002 |

* cited by examiner

*Primary Examiner* — Seth Dumbris
*Assistant Examiner* — Kim S. Horger
(74) *Attorney, Agent, or Firm* — Fox Rothschild LLP

(57) ABSTRACT

Disclose is a copper alloy for a laser cladding valve seat. the copper alloy may include an amount of about 15.0 to 25.0 wt % of Ni, an amount of about 1.0 to 4.0 wt % of Si, an amount of about 0.5 to 1.0 wt % of B, an amount of about 1.0 to 2.0 wt % of Cr, an amount of about 5.0 to 15.0 wt % of Co, an amount of about 2.0 to 20.0 wt % of Mo, an amount of about 0.1 to 0.5 wt % of Ti and the balance Cu, all the wt % based on the total weight of the copper alloy. Particularly, the copper alloy may not include Fe, and may include Ti silicacide. Further disclosed is a laser cladding valve seat including the copper alloy, which does not generate cracks and is excellent in wear resistance.

3 Claims, 2 Drawing Sheets

US 11,624,103 B2

COPPER ALLOY FOR LASER CLADDING VALVE SEAT

CROSS-REFERENCE TO RELATED APPLICATIONS

This application claims priority under 35 U.S.C. § 119 to Korean Patent Application No. 10-2019-0167659, filed on Dec. 16, 2019, in the Korean Intellectual Property Office, the disclosure of which is incorporated herein by reference in its entirety.

TECHNICAL FIELD

The present invention relates to a copper alloy for a laser cladding valve seat, and more particularly, to a composition of a copper alloy for increasing crack resistance and wear resistance.

BACKGROUND OF THE INVENTION

A valve seat used in laser cladding is a part that causes continuous friction with a valve, and wear resistance has always been considered when a material for the valve seat is designed. The focus of the material design may be adding alloying elements such as iron (Fe), chromium (Cr), cobalt (Co), and molybdenum (Mo) to a copper (Cu)-nickel (Ni)-silicon (Si) matrix structure, which may not only improve wear resistance but also secure robustness. In particular, Fe has been treated as a main element capable of improving the wear resistance of a valve seat because Fe forms hard particles having excellent heat resistance together with Co, Mo, and the like. However, since a small amount of Fe solid-dissolved in Cu enhances the brittleness of a rapidly cooled structure after laser cladding, cracks may be generated in a valve seat. Since cracks generated in a valve seat cause loss of the main function of the valve seat for maintaining the airtightness of a combustion chamber, there is a need for preventing cracks from being generated in the valve seat.

SUMMARY

In preferred aspects, provided is, inter alia, an alloy composition, or a copper alloy, capable of simultaneously improving crack resistance and wear resistance.

In an aspect, provided is a copper alloy for a laser cladding valve seat. The copper alloy may include: an amount of about 15.0 to 25.0 wt % of nickel (Ni), an amount of about 1.0 to 4.0 wt % of silicon (Si), an amount of about 0.5 to 1.0 wt % of boson (B), an amount of about 1.0 to 2.0 wt % of chromium (Cr), an amount of about 5.0 to 15.0 wt % of cobalt (Co), an amount of about 2.0 to 20.0 wt % of molybdenum (Mo), an amount of about 0.1 to 0.5 wt % of titanium (Ti) and the balance of copper (Cu). All the wt % are based on the total weight of the copper alloy or its composition.

Preferably, the copper alloy may not include Fe.
Preferably, the copper alloy may include Ti silicacide.
Preferably, the copper alloy may include Co—Mo-based hard particles.
Preferably, the copper alloy may not include Fe-based hard particles.
Preferably, a total content of Co and Mo may be an amount of about 7.5 to 22.5 wt %.
Preferably, the copper alloy may further include an amount of about 0.1 to 0.3 wt % of phosphorus (P).

Further provided is a laser cladding valve seat including the copper alloy or its composition as described herein.

Other aspects are disclosed infra.

DETAILED DESCRIPTION

Figure 1:
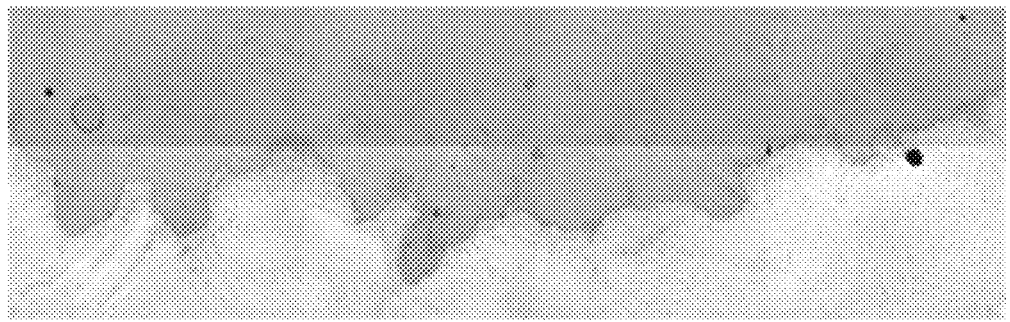
FIG. 1 is a photograph taken of a bonding interface in Example 4 according to an exemplary embodiment of the present invention.

Hereinafter, the present invention will be described in detail. However, the present invention is not limited or restricted by exemplary embodiments, objects and effects of the present invention will be naturally understood or become apparent from the following description, and the objects and effects of the present invention are not limited by only the following description. Further, in the description of the present invention, when it is determined that the detailed description for the publicly-known technology related to the present invention can unnecessarily obscure the gist of the present invention, the detailed description thereof will be omitted.

The terminology used herein is for the purpose of describing particular exemplary embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In an aspect, provided is a copper alloy ("copper alloy composition" or "alloy composition") for a laser cladding valve seat, and may include an amount of about 15.0 to 25.0 wt % of Ni, an amount of about 1.0 to 4.0 wt % of Si, an amount of about 0.5 to 1.0 wt % of B, an amount of about 1.0 to 2.0 wt % of Cr, an amount of about 5.0 to 15.0 wt % of Co, an amount of about 2.0 to 20.0 wt % of Mo, an amount of about 0.1 to 0.5 wt % of Ti and the balance Cu. All the wt % are based on the total weight of the copper alloy.

The copper alloy may improve crack resistance in a clad layer (referred to as a layer formed by cladding an alloy powder) and crack resistance at a bonding interface between the clad layer and a base material (referred to as a cylinder head and composed of an Al alloy) by including no Fe which is one of the hard particle-forming elements. Although the wear resistance of a matrix structure may be reduced by not adding Fe to the copper alloy, the problem of deterioration in the wear resistance of the matrix structure may be solved by adding Ti and forming Ti silicacide. Meanwhile, as the copper alloy does not include Fe, the copper alloy may not include Fe-based hard particles, for example, Fe—Mo-based hard particles, and may include Co—Mo-based hard particles instead of Fe-based hard particles. Hereinafter, the contents of the alloying elements included in the copper alloy and the technical significance thereof will be described in detail.

(1) Ni in an Amount of about 15.0 to 25.0 wt %

Ni may be solid-dissolved in Cu, and may improve the toughness and heat resistance of a matrix structure as a solid solution strengthening effect. Further, Ni may form structures such as $Ni_3B$ and $Ni_3Si$, for example, by bonding to B and Si which are components of a matrix structure. The structures such as $Ni_3B$ and $Ni_3Si$ may be dispersed in the matrix structure to improve the wear resistance and heat resistance of the matrix structure. In addition, Ni may be bonded to Co, Mo, and the like to form hard particles, thereby improving the wear resistance. The content of Ni may be about 15 wt % or greater in order to sufficiently secure the above-described effect of adding Ni. However, when Ni is added in an amount of greater than about 25 wt %, an excessive amount of Ni, which is bonded to elements such as B, Si, Co, and Mo and remains, may not be solid-dissolved in Cu, thereby reducing the hardness of a matrix structure. Therefore, the maximum amount of Ni added is limited to an amount of about 25 wt % or less.

(2) Si in an Amount of about 1.0 to 4.0 wt %

Si may form silicides with Cu, Ni, B, Cr, Co, Mo, and the like, and may play a major role in strengthening particularly the matrix of a Cu-based matrix structure. Silicides may improve high-temperature wear resistance and may improve the wettability to the surface of the base material by increasing the fluidity of a molten copper alloy during laser cladding, such that the bondability between the base material and the copper alloy may be improved. The content of Si may be about 1.0 wt % or greater in order to sufficiently secure the above-described effect of adding Si. However, when Si is added in an amount of greater than about 4.0 wt %, segregation may be formed on the alloy. Therefore, the maximum amount of Si added is limited to 4.0 wt %.

(3) B in an Amount of about 0.5 to 1.0 wt %

B may improve the weldability by removing an oxide film layer strongly formed on the surface of a base material which is an Al alloy. B may be bonded to oxygen to serve as a flux during laser cladding, thereby effectively removing pores generated inside, and may be bonded to Ni to form $Ni_3B$, thereby improving high temperature wear resistance. The content of B may be about 0.5 wt % or greater of B in order to sufficiently secure the above-described effect of adding B. However, when B is added in an amount of greater than about 1.0 wt %, boride may be formed, so that the brittleness of the alloy may be increased, and the crack resistance of the alloy may deteriorate. Therefore, the maximum amount of B added is limited to an amount of about 1.0 wt % or less.

(4) Cr in an Amount of about 1.0 to 2.0 wt %

Cr may improve wear resistance by forming hard particles with Co and Mo. The content of Cr is about 1.0 wt % or greater in order to sufficiently secure the effect of adding Cr. However, when Cr is added in an amount of greater than about 2.0 wt %, dissolved oxygen may also be bonded to Cr having a high oxygen affinity to inhibit the formation of an oxide film on the surface of a Co—Mo-based hard particles, and accordingly, the wear resistance of a matrix structure may deteriorate. Therefore, the maximum amount of Cr added is limited to an amount of about 2.0 wt % or less.

(5) Co in an Amount of about 5.0 to 15.0 wt %

Co may be bonded to Mo to form Co—Mo-based hard particles having excellent wear resistance. The content of Co may be about 5.0 wt % or greater in order to sufficiently secure the effect of adding Co. However, when Co is added in an amount of greater than about 15.0 wt %, Co may penetrate into a Ni—Si structure to reduce crack resistance. Therefore, the maximum amount of Co added is limited to an amount of about 15.0 wt % or less.

(6) Mo in an Amount of about 2.0 to 20.0 wt %

Mo may be bonded to Co to form Co—Mo-based hard particles having excellent wear resistance. The content of Mo may be an amount of about 2.0 wt % or greater in order to sufficiently secure the effect of adding Mo. However, when Mo is added in an amount of greater than about 20 wt %, the toughness of hard particles may deteriorate, and the valve seat may be damaged. Therefore, the maximum amount of Mo added is limited to an amount of about 20 wt % or less.

(7) Ti in an Amount of about 0.1 to 0.5 wt %

Ti may be bonded to Si in a matrix structure to form Ti silicacide. The Ti silicacide, which is a hard particle, may be excellent in wear resistance and may improve the strength of an entire matrix structure. Except for the content of Ti solid-dissolved in the matrix structure, an amount of about 70 wt % of the amount of Ti added may be used to form Ti silicacide. Preferably, an amount of about 0.07 to 0.35 wt % of Ti silicacide may be formed in the copper alloy. For example, according to exemplary embodiments of the present invention, e.g., Examples 1 to 5 described below, an amount of about 0.35 wt % of Ti-silicacide may preferably be included in the copper alloy. The content of Ti may be about 0.1 wt % or greater in order to sufficiently secure the effect of adding Ti. The content of Ti may be about 0.2 wt % or greater, about 0.3 wt % or greater of Ti, or particularly about 0.4 wt % or greater. However, Ti, which is an element having a very high degree of oxidation, may form Ti—O slag when added in an excessive amount, and may make the powdering process unstable. Furthermore, a Ti—Al intermetallic compound may be formed at a bonding interface with a base material, and accordingly, cracks may be induced at the bonding interface. Therefore, the maximum amount of Ti added is limited to an amount of about 0.5 wt % or less.

The total content of Co and Mo included in the present invention may be an amount of about 7.5 to 22.5 wt %. When Co and Mo are added in an amount of less than about 7.5 wt %, the wear resistance may deteriorate, and when Co and Mo are added in an amount of greater than about 22.5 wt %, the wear resistance may be improved, but the amount of cracks generated may be increased.

The present invention may further include an amount of about 0.1 to 0.3 wt % of phosphorus (P). P may remarkably improve the moldability by serving as a deoxidizing agent in the molten metal during the production of a spherical powder, and may effectively remove pores at the bonding interface during the cladding. However, when the content of P is greater than about 0.3 wt %, crack resistance may rapidly deteriorate. Therefore, the maximum content of P is limited to an amount of about 0.3 wt % or less.

TABLE 1

| Classification | Cu | Ni | Si | B | Cr | Co | Fe | Mo | Ti |
|---|---|---|---|---|---|---|---|---|---|
| Example 1 | Bal. | 20.0 | 3.0 | 0.75 | 1.5 | 7.0 | — | 3.0 | 0.5 |
| Example 2 | Bal. | 20.0 | 3.0 | 0.5 | 1.5 | 7.0 | — | 3.0 | 0.5 |
| Example 3 | Bal. | 20.0 | 3.0 | 0.75 | 2.0 | 7.0 | — | 3.0 | 0.5 |
| Example 4 | Bal. | 20.0 | 3.0 | 0.75 | 1.5 | 10.0 | — | 4.0 | 0.5 |
| Example 5 | Bal. | 20.0 | 3.0 | 0.75 | 1.5 | 10.0 | — | 4.0 | 0.1 |
| Example 6 | Bal. | 20.0 | 3.0 | 0.75 | 1.5 | 10.0 | — | 4.0 | 0.2 |
| Example 7 | Bal. | 20.0 | 3.0 | 0.75 | 1.5 | 10.0 | — | 4.0 | 0.3 |
| Comparative Example 1 | Bal. | 20.0 | 3.0 | 0.75 | 1.5 | 7.0 | — | 3.0 | — |
| Comparative Example 2 | Bal. | 20.0 | 3.0 | — | 0.5 | 1.0 | 5.0 | 10.0 | — |
| Comparative Example 3 | Bal. | 20.0 | 3.0 | — | 0.5 | 1.0 | 10.0 | 15.0 | — |
| Comparative Example 4 | Bal. | 20.0 | 3.0 | — | 0.5 | 1.0 | 20.0 | 20.0 | — |
| Comparative Example 5 | Bal. | 20.0 | 3.0 | 0.75 | 1.5 | 25.0 | — | 10.0 | — |
| Comparative Example 6 | Bal. | 20.0 | 3.0 | 0.75 | 1.5 | 10.0 | — | 4.0 | 0.6 |
| Comparative Example 7 | Bal. | 20.0 | 3.0 | 0.75 | 1.5 | 10.0 | — | 4.0 | 0.7 |
| Comparative Example 8 | Bal. | 20.0 | 3.0 | 0.75 | 1.5 | 5.0 | — | 2.0 | 0.5 |

| Classification | Number of cracks | Number of interfacial cracks | Wear amount ($\mu m^2$) | Hardness (HV) | Porosity (%) |
|---|---|---|---|---|---|
| Example 1 | 0 | 0 | 442,312 | 287 | 1.12 |
| Example 2 | 0 | 0 | 463,247 | 285 | 2.54 |
| Example 3 | 0 | 0 | 443,247 | 290 | 1.03 |
| Example 4 | 0 | 0 | 389,572 | 297 | 0.93 |
| Example 5 | 0 | 0 | 412,214 | 282 | 0.99 |
| Example 6 | 0 | 0 | 390,236 | 284 | 0.91 |
| Example 7 | 0 | 0 | 385,244 | 291 | 0.76 |
| Comparative Example 1 | 0 | 0 | 843,264 | 282 | 1.20 |
| Comparative Example 2 | 5 | 0 | 623,115 | 306 | 3.02 |
| Comparative Example 3 | 8 | 0 | 586,213 | 312 | 3.23 |
| Comparative Example 4 | 14 | 0 | 423,230 | 336 | 3.45 |
| Comparative Example 5 | 3 | 0 | 241,243 | 311 | 1.02 |
| Comparative Example 6 | 0 | 1 | 376,543 | 287 | 0.96 |
| Comparative Example 7 | 0 | 3 | 399,427 | 295 | 0.94 |
| Comparative Example 8 | 0 | 0 | 672,569 | 285 | 1.11 |

Table 1 shows the compositions of Examples 1 to 7 and Comparative Examples 1 to 8 of the present invention. The unit of each alloying element is wt % based on the total weight of the copper alloy or its composition. Table 2 shows the results of evaluating physical properties of the respective Examples and Comparative Examples. The evaluation items are the number of cracks, the number of interfacial cracks, the wear amount, the hardness, and the porosity.

The number of cracks is obtained by forming a cladding layer having a height of 15 mm on a base material with the components shown in Table 1 and then measuring the number of cracks that are generated from the bottom of the cladding layer to a point where the height becomes 10 mm. It is preferred that the number of cracks is 0.

The number of interfacial cracks means the number of cracks generated at the bonding interface between a base material and a cladding layer. It is preferred that the number of interfacial cracks is 0.

The wear amount is obtained by operating a reciprocating friction and wear tester manufactured by Bruker Corporation for a sample at a load of 30 N, a temperature of 250° C., a stroke of 7 mm, and a frequency of 6 Hz in a $N_2$ gas atmosphere for 30 minutes, and then measuring the cross-sectional area of the sample. It is preferred that the wear amount is 500,000 $\mu m^2$ or less.

The hardness indicates an average value of five measured values measured in accordance with ISO 6507 which is a Vickers hardness test method for a metal material. It is preferred that the hardness is about HV250 or greater.

The porosity is obtained by measuring the porosity at the bonding interface using Image Analyzer X100. It is preferred that the porosity is 3.0% or less.

As shown in Tables 1 and 2, in Examples 1 to 7, cracks were not generated at the cladding layer and the bonding interface, all the wear amounts were 500,000 $\mu m^2$ or less, the hardnesses were HV250 or greater, and the porosities were 3.0% or less. FIG. 1 is a photograph taken of a bonding interface in Example 4, and through FIG. 1, cracks were not generated at the bonding interface.

Comparative Example 1 has the same composition as Example 1, except that Comparative Example 1 does not include Ti. When the wear resistance of Example 1 is compared with that of Comparative Example 1, the wear resistance of Example 1 is about 2 times better than that of Comparative Example 1. Accordingly, deterioration in wear resistance due to the elimination of Fe may be solved by adding Ti.

In addition, when the compositions of Comparative Examples 2 to 4 are compared with one another, the contents of Cr and the contents of Co are 0.5 wt % and 1.0 wt %, respectively and are the same as one another, but in terms of each content of Fe and Mo or the total content of Fe and Mo, the value in Comparative Example 3 is greater than that in Comparative Example 2, and the value in Comparative Example 4 is greater than that in Comparative Example 3. Comparative Examples 2 to 4 are comparative examples for forming Fe—Mo-based hard particles instead of the target Co—Mo-based hard particles of the present invention, and evaluated physical properties when the contents of Fe and Mo were varied. As the contents of Fe and Mo were increased, the wear resistance and hardness were increased, but the number of cracks and porosity in the cladding layer were also increased.

Comparative Example 5 is a comparative example in which Co was added in excess instead of the addition of Ti. In particular, due to the excessive addition of Co, the wear resistance, hardness, and porosity satisfied the target physical properties of the copper alloy, but failed to satisfy the target criteria for improving the crack resistance of the present invention.

Figure 2:
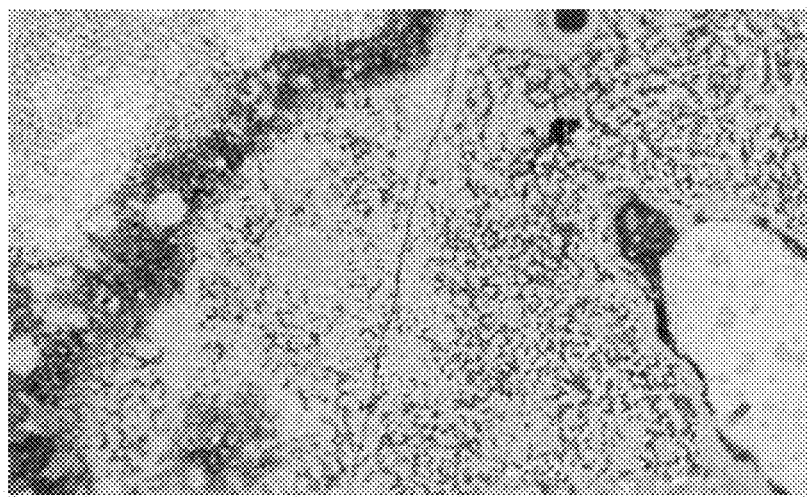
FIG. 2 is a photograph taken of a bonding interface in Comparative Example 6.

Comparative Examples 6 and 7 have the same composition as Example 4 except that Ti was included by 0.1 wt % and 0.2 wt % greater, respectively than Example 4. The wear amounts, hardnesses, and porosities in Comparative Examples 6 and 7 satisfied the target physical properties of the copper alloy, but failed to satisfy the target criteria for improving the crack resistance of the present invention due to the excessive addition of Ti. FIG. 2 is a photograph taken of a bonding interface in Comparative Example 6, and through FIG. 2, cracks were generated at the bonding interface.

The total content of Co and Mo in Comparative Example 8 was 7 wt %, which was less than 7.5 wt % in the preferred amount of the copper alloy of the present invention. Due to the addition of 0 wt % of Fe or 0.5 wt % of Ti, the wear resistance failed to meet the target criteria for wear resistance of the present invention.

Table 3 shows the compositions of Examples 8 and 9 and Comparative Example 9. The unit of each alloying element is wt % based on the total weight of the copper alloy or its composition. Examples 8 and 9 and Comparative Example 9 had the same composition as Example 1, except that Examples 8 and 9 and Comparative Example 9 included P in an amount of 0.1 wt %, 0.3 wt %, and 0.5 wt % greater, respectively than Example 1. Table 4 shows results of evaluating physical properties of Examples 8 and 9 and Comparative Example 9. Evaluation items and evaluation methods are as described above. As shown in Tables 3 and 4, as the amount of P added was increased, the porosity was decreased, but in Comparative Example 8, cracks were generated due to the excessive addition of P.

According to various exemplary embodiments of the present invention, a copper alloy for a laser cladding valve seat, which does not generate cracks and is excellent in wear resistance, can be provided.

In addition, according to various exemplary embodiments of the present invention, a copper alloy for a laser cladding valve seat in which porosity at a bonding interface is remarkably reduced can be provided.

The present invention has been described in detail through representative Examples, but it is to be understood by a person with ordinary skill in the art to which the present invention pertains that various modifications are possible in the above-described Examples within the range not departing from the scope of the present invention. Therefore, the scope of the present invention should not be limited to the above-described Examples but should be determined by not only the claims to be described below but also all the changes or modified forms derived from the claims and the equivalent concept thereof.

What is claimed is:

1. A copper alloy for a laser cladding valve seat, comprising:
    an amount of about 15.0 to 25.0 wt % of nickel (Ni),
    an amount of about 1.0 to 4.0 wt % of Si, 0.5 to 1.0 wt % of boron (B),
    an amount of about 1.0 to 2.0 wt % of chromium (Cr),
    an amount of about 5.0 to 15.0 wt % of cobalt (Co),
    an amount of about 2.0 to 20.0 wt % of molybdenum (Mo),
    an amount of about 0.1 to 0.5 wt % of titanium (Ti);
    an amount of about 0.1 to 0.3 wt % of phosphorus (P); and
    the balance of copper (Cu),
    all the wt % based on the total weight of the copper alloy,
    wherein the copper alloy does not comprise iron (Fe);
    wherein a total content of Co and Mo is an amount of about 7.5 to 22.5 wt %;
    wherein the copper alloy comprises an amount of about 0.07 to 0.35 wt % of Ti silicacide;
    wherein the copper alloy has a wear amount of about 500,000 μm2 or less while cracks are not generated;
    wherein the copper alloy has a hardness of about HV250 or greater;
    wherein the copper alloy has a porosity of about 3.0% or less.

2. The copper alloy of claim 1, wherein the copper alloy comprises Co—Mo-based hard particles.

3. A laser cladding valve sheet comprising the copper alloy of claim 1.

TABLE 3

| Classification | Cu | Ni | Si | B | Cr | Co | Fe | Mo | Ti | P |
|---|---|---|---|---|---|---|---|---|---|---|
| Example 8 | Bal. | 20.0 | 3.0 | 0.75 | 1.5 | 7.0 | — | 3.0 | 0.5 | 0.1 |
| Example 9 | Bal. | 20.0 | 3.0 | 0.75 | 1.5 | 7.0 | — | 3.0 | 0.5 | 0.3 |
| Comparative Example 9 | Bal. | 20.0 | 3.0 | 0.75 | 1.5 | 7.0 | — | 3.0 | 0.5 | 0.5 |

TABLE 4

| | Number of cracks | Wear amount (μm$^2$) | Hardness (HV) | Porosity (%) |
|---|---|---|---|---|
| Example 8 | 0 | 423,412 | 291 | 0.82 |
| Example 9 | 0 | 465,321 | 287 | 0.61 |
| Comparative Example 9 | 2 | 444,267 | 292 | 0.45 |